US009537531B2

(12) United States Patent
Tomisawa

(10) Patent No.: US 9,537,531 B2
(45) Date of Patent: Jan. 3, 2017

(54) COMMUNICATION DEVICE AND ITS CONTROL METHOD

(71) Applicant: Renesas Electronics Corporation, Tokyo (JP)

(72) Inventor: Satoru Tomisawa, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/047,765

(22) Filed: Feb. 19, 2016

(65) Prior Publication Data

US 2016/0248471 A1    Aug. 25, 2016

(30) Foreign Application Priority Data

Feb. 24, 2015  (JP) ................................ 2015-034053

(51) Int. Cl.
| | | |
|---|---|---|
| *H04B 1/46* | (2006.01) | |
| *H04B 1/44* | (2006.01) | |
| *H04B 1/48* | (2006.01) | |

(52) U.S. Cl.
CPC .......... *H04B 1/48* (2013.01); *H04B 2001/485* (2013.01)

(58) Field of Classification Search
CPC .............. H04B 1/16; H04B 1/38; H04B 1/40; H04B 1/006; H04B 1/0053; H04B 1/0082; H04B 1/403; H04B 1/408; H04B 1/0491; H03L 1/027; H03L 7/24
USPC ....................... 455/78, 79, 82, 83, 84, 85, 86
See application file for complete search history.

(56) References Cited

U.S. PATENT DOCUMENTS

| | | | | |
|---|---|---|---|---|
| 5,819,161 A * | 10/1998 | Saito | ...................... | H04B 1/403 455/86 |
| 5,896,562 A * | 4/1999 | Heinonen | .............. | H03D 7/165 455/78 |
| 6,347,219 B1* | 2/2002 | Takinami | ............... | H04B 1/405 455/112 |
| 6,370,361 B1* | 4/2002 | Hung | ...................... | H04B 1/44 455/83 |
| 6,714,765 B1* | 3/2004 | Kimppa | ................. | H04B 1/005 455/82 |

(Continued)

FOREIGN PATENT DOCUMENTS

JP        7-38453 A      2/1995

*Primary Examiner* — Quochien B Vuong
(74) *Attorney, Agent, or Firm* — Sughrue Mion, PLLC

(57) ABSTRACT

A communication device includes a communication circuit capable of switching a reception or a transmission of a desired frequency signal through an antenna. The circuit includes an oscillator that oscillates a first frequency signal according to the desired frequency signal at a receiving time, a first divider that outputs a second frequency signal obtained by dividing the first frequency signal into two, a second divider that outputs a third frequency signal obtained by dividing the second frequency signal into two, a first mixer that mixes the reception signal received through the antenna and the first frequency signal and outputs an intermediate frequency signal, a second mixer that mixes the intermediate frequency signal and the third frequency signal and outputs a baseband signal, a third mixer capable of mixing the output from the first divider and the output from the second divider, and a filter circuit that eliminates a signal component of the frequency of an output signal from the third mixer from the reception signal at the receiving time.

11 Claims, 10 Drawing Sheets

(56) References Cited

U.S. PATENT DOCUMENTS 8,213,879 B2 * 7/2012 Zellweger ............... H04B 1/28
            455/86
8,938,204 B2 * 1/2015 Oishi .................... H03B 21/01
            455/84

* cited by examiner

COMMUNICATION DEVICE AND ITS CONTROL METHOD

CROSS-REFERENCE TO RELATED APPLICATIONS

The disclosure of Japanese Patent Application No. 2015-034053 filed on Feb. 24, 2015 including the specification, drawings and abstract is incorporated herein by reference in its entirety.

BACKGROUND

This disclosure relates to a communication device and more particularly, to a communication device including a communication circuit.

When receiving a desired frequency signal, in a communication device including a communication circuit, an interference wave signal (noise) superimposed on or coupled to the received signal (noise) has to be eliminated (refer to Japanese Unexamined Patent Application Publication No. Hei 7(1995)-38453).

In the above Patent Publication, there is proposed a method of detecting the frequency of an interference wave and generating the frequency signal of the detected interference wave, to eliminate the interference wave signal.

SUMMARY

In the above method, however, a tuning circuit for detecting the frequency of the interference wave and an oscillator have to be provided additionally, and a complicated control is required disadvantageously.

In order to solve the above problem, this disclosure is to provide a communication device and its control method capable of eliminating an interference wave in a simple system.

Other objects and new characteristics will be apparent from the description and the attached drawings of this specification.

According to one embodiment, the communication device includes a communication circuit capable of switching a reception or a transmission of a desired frequency signal through an antenna. The communication circuit includes an oscillator that oscillates a first frequency signal according to the desired frequency signal at a receiving time, a first divider that outputs a second frequency signal obtained by dividing the first frequency signal into two, a second divider that outputs a third frequency signal obtained by dividing the second frequency signal into two, and a first mixer that mixes the reception signal received through the antenna and the first frequency signal and outputs an intermediate frequency signal. The communication circuit further includes a second mixer that mixes the intermediate frequency signal and the third frequency signal and outputs a baseband signal, a third mixer capable of mixing the output from the first divider and the output from the second divider, and a filter circuit that eliminates a signal component of the frequency of an output signal from the third mixer from the reception signal at the receiving time.

According to the embodiment, the communication device can eliminate the interference wave in a simple system.

DETAILED DESCRIPTION

This embodiment will be described in detail with reference to the drawings. The same reference codes are attached to the same or corresponding portions and the description thereof is not repeated.

Figure 1:
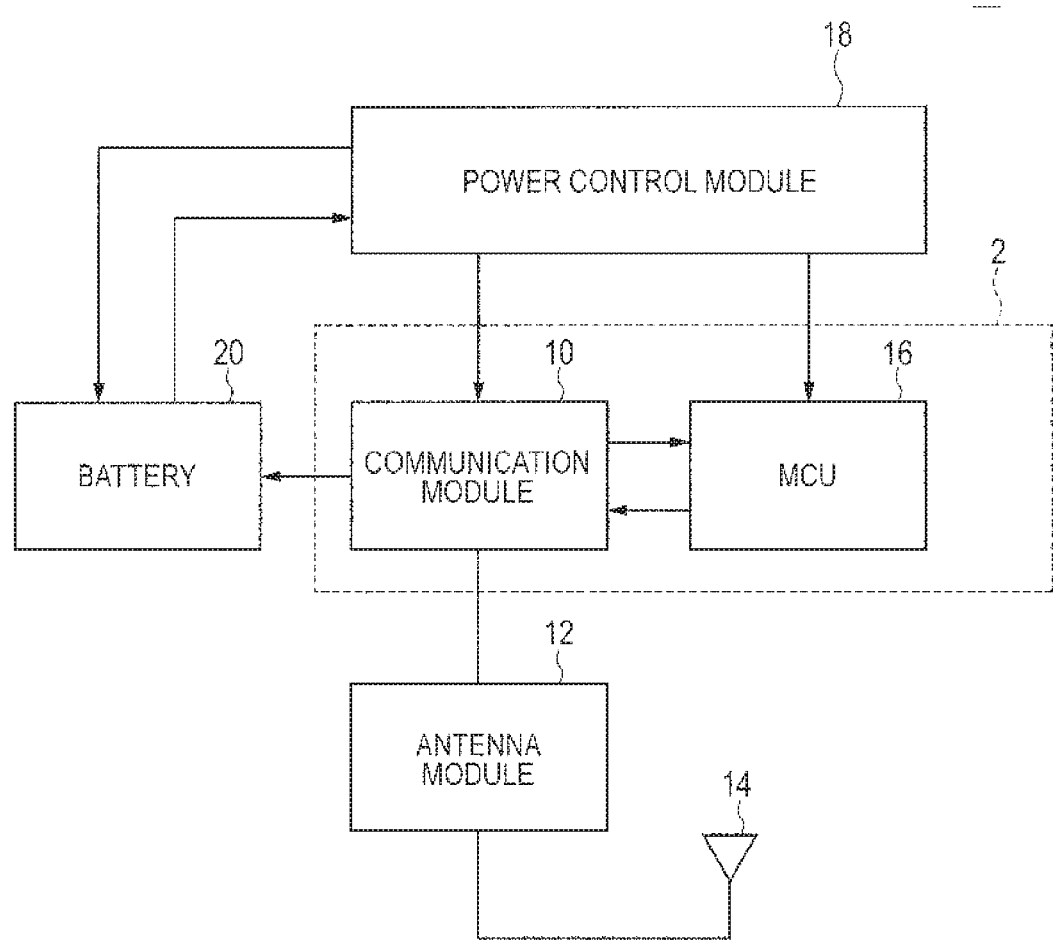
FIG. 1 is a view for use in describing the structure of a communication device 1 according to an embodiment.

FIG. 1 is a view for use in describing the structure of a communication device 1 according to the embodiment.

In FIG. 1, the communication device 1 for transmitting and receiving RF signals is illustrated.

Here, as the RF signal, a signal, for example, in 2.4 GHz-band is used.

The communication device 1 includes a semiconductor device 2, an antenna module 12, an antenna 14, a power control module 18, and a battery 20.

The semiconductor device 2 includes, for example, a communication module 10 and a Main Control Unit (MCU) 16. The semiconductor device 2 may include the whole or a part of the antenna module 12 and the power control module 18. Alternatively, the semiconductor device 2 may exclude the whole or a part of the MCU 16.

The power control module 18 is coupled to the battery 20, to supply necessary power to each unit.

The MCU 16 controls the whole of the communication device 1.

The antenna module 12 is coupled between the antenna 14 and the communication module 10, to perform impedance matching on a signal received from the antenna 14 or a transmission signal to the antenna 14.

The communication module 10 operates according to an instruction of the MCU 16, to perform the transmission and reception processing through the antenna module 12 coupled to the antenna 14. The communication module 10 outputs the received signal to the MCU 16. Further, the communication module 10 outputs the transmission signal from the antenna 14 according to the instruction from the MCU 16.

Figure 2:
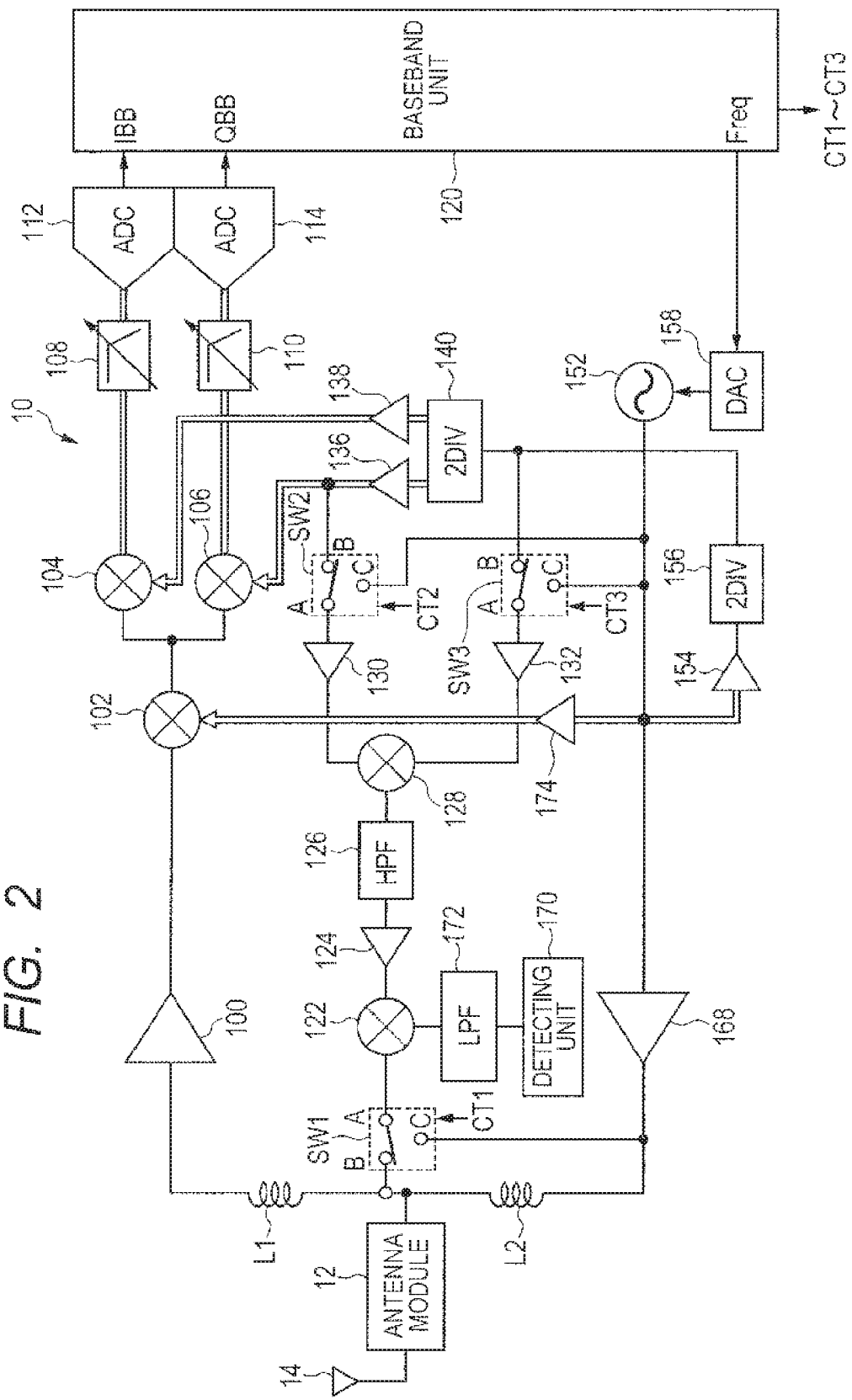
FIG. 2 is a view for use in describing the structure of a communication module 10 of the communication device 1 according to the embodiment.

FIG. 2 is a view for use in describing the structure of the communication module 10 of the communication device 1 according to the embodiment.

As illustrated in FIG. 2, the communication module 10 includes a receiving coil L1, a transmitting coil L2, amplifiers 100, 124, 130, 132, 136, 138, 154, 168, and 174, mixers 102 to 106, 122, and 128, Low Pass Filters (LPF) 108, 110, and 172, AD converters 112 and 114, a baseband unit 120, a High Pass Filter (HPF) 126, 2 dividers 140 and 156, an oscillator 152, a DA converter 158, a detecting unit 170, and switches SW1 to SW3.

The receiving processing will be described.

The reception signal received through the receiving coil L1 is amplified by the amplifier 100 to be output to the mixer 102.

The communication module is of a sliding IF mixer system, and the reception signal is converted into a baseband signal through two stages of mixers.

The mixer 102 mixes the RF signal amplified by the amplifier 100 and the local signal amplified by the amplifier 174, down-converts the resultant system into an intermediate frequency signal of an intermediate frequency band, and outputs the signal. The local signal is oscillated by the oscillator 152.

The oscillator 152 is formed by a voltage control oscillator. The DA converter 158 converts a signal into analog voltage (control voltage), according to the instruction Freq for controlling the frequency from the baseband unit 120. The control voltage is input to the oscillator 152 and from the oscillator 152, a local signal of a desired frequency is oscillated.

The local signal oscillated by the oscillator 152 is amplified by the amplifier 174 and output to the mixer 102.

An intermediate frequency signal output from the mixer 102 is output to the mixers 104 and 106.

The mixers 104 and 106 are orthogonal demodulators to generate Ich and Qch baseband signals, according to the intermediate frequency signal and a predetermined frequency signal.

The Ich and Qch baseband signals respectively output from the mixers 104 and 106 pass through the LPFs 108 and 110.

The LPFs 108 and 110 perform the filtering processing for eliminating a high frequency component of the input signal to output the baseband signals which have been converted into a desired frequency to the AD converters 112 and 114.

The Ich and Qch baseband signals are converted into digital signals by the AD converters 112 and 114 and input to the baseband unit 120 as data IBB and QBB.

The local signal oscillated by the oscillator 152 is amplified by the amplifier 154. The local signal amplified by the amplifier 154 is converted into a half frequency by the 2 divider 156.

The signal converted by the 2 divider 156 is further converted into a half frequency by the 2 divider 140. The frequency signal converted by the 2 divider 140 is amplified by the amplifier 136 and input to the mixer 106. Further, the frequency signal converted by the 2 divider 140 is amplified by the amplifier 138 and input to the mixer 104.

The signal output from the 2 divider 156 is amplified by the amplifier 132 through the switch SW3 and output to the mixer 128.

The signal output from the amplifier 136 is amplified by the amplifier 130 through the switch SW2 and output to the mixer 128.

Each switch SW includes contacts A to C, and according to the instruction, a connection relation can be changed.

Each of the switches SW2 and SW3 couples the contact A and the contact B at the receiving time according to the instruction and couples the contact A and the contact C at the transmitting time according to the instruction.

The contact B of the switch SW2 is coupled to the amplifier 136. The contact A is coupled to the input side of the amplifier 130. The contact C is coupled to the oscillator 152.

The contact B of the switch SW3 is coupled to the 2 divider 156. The contact A is coupled to the input side of the amplifier 132. The contact C is coupled to the oscillator 152.

The mixer 128 mixes the frequency signals respectively output from the amplifiers 130 and 132 and outputs the signal to the HPF 126.

The signal passing through the HPF 126 is amplified by the amplifier 124 and input to the mixer 122.

The switch SW1 couples the antenna module 12 and the mixer 122.

The switch SW1 couples the contact A to the mixer 122. The contact B is coupled to the input side of the antenna module. The contact C is coupled to the amplifier 168.

The mixer 122 is coupled to the LPF 172. The LPF 172 is coupled to the detecting unit 170.

In this example, the mixer 122 forms a filter circuit for eliminating an interference wave from the reception signal.

Next, the transmission processing will be described.

The oscillator 152 oscillates a signal of a desired transmission frequency according to the instruction of the baseband unit 120. The DA converter 158 converts a signal into analog voltage (control voltage), according to the instruction Freg for controlling the frequency from the baseband unit 120. The control voltage is input to the oscillator 152 and the local signal of a desired frequency is oscillated from the oscillator 152.

The amplifier 168 amplifies the local signal oscillated by the oscillator 152 and outputs the above. The signal amplified by the amplifier 168 is output to the antenna module 12 through the transmitting coil L2. Then, it is output to the outside through the antenna 14.

At the transmitting time, each of the switches SW2 and SW3 couples the contact A to the contact C. The signal of the desired transmission frequency oscillated by the oscillator 152 is amplified by the amplifiers 130 and 132 and input to the mixer 128.

The mixer 128 mixes the signals from the amplifiers 130 and 132 and outputs the resultant signal to the HPF 126.

The signal passing through the HPF 126 is amplified by the amplifier 124 and output to the mixer 122.

The switch SW1 couples the contact A to the contact C at the transmitting time. According to this, the mixer 122 is coupled to the output node of the amplifier 168.

The mixer 122 eliminates the frequency component that is the interference wave from the signal transmitted to the output node of the amplifier 168. The electric power of the eliminated frequency component that is the interference wave is collected through the LPF 172 and the detecting unit 170.

The antenna module 12 passes only the signals of a desired transmission frequency and outputs the signals of the desired transmission frequency from the antenna 14.

The baseband unit 120 switches and outputs the control signals CT1 to CT3 at the transmitting and receiving time and the switches SW1 to SW3 switch the connection relation according to the control signals CT1 to CT3.

Here, the interference wave will be described.

FIGS. 3A to 3D are views for use in describing the frequency conversion in the communication device 1 according to the embodiment.

Figure 3A:
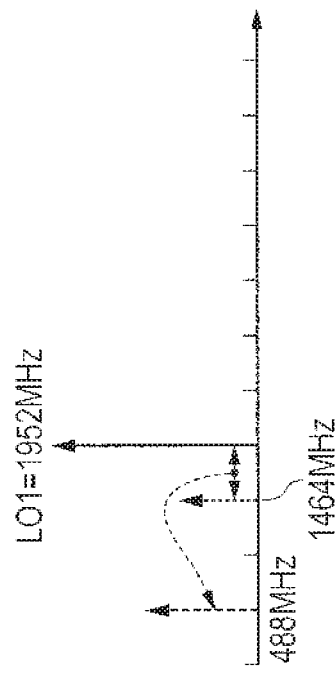
FIGS. 3A to 3D are views for use in describing frequency conversion in the communication device 1 according to the embodiment.

As illustrated in FIG. 3A, the case of receiving 2440 MHz as a desired frequency signal will be described.

The local signal LO1 of the oscillator 152 is set at 1952 MHz. Here, the frequency of the local signal LO1 is set at ⅘ of the desired frequency signal.

The mixer 102 mixes the received desired frequency signal (2440 MHz) and the local signal LO1 (1952 MHz) and outputs the intermediate frequency signal (2440−1952=488 MHz).

Figure 3C:
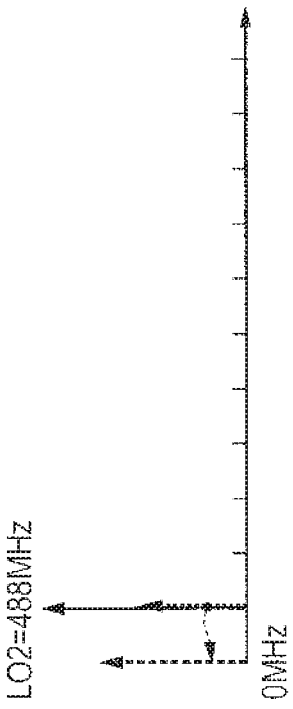
Figure 3B:
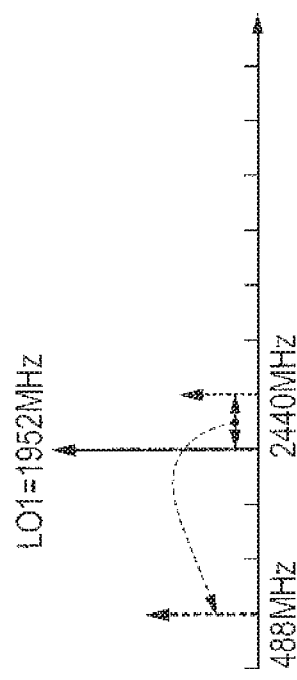

Next, as illustrated in FIG. 3B, the mixers 104 and 106 convert the signal into a baseband signal (0 MHz) according to the intermediate frequency signal (488 MHz) and the local signal LO2 (488 MHz). The local signal LO2 (488 MHz) is a signal obtained by dividing the local signal LO1 (1952 MHz) into two by the 2 divider 156 and further dividing the above result into two by the 2 divider 140.

FIG. 3C describes the case of receiving the interference wave signal (1464 MHz). In the case of receiving the interference wave signal (1464 MHz), the mixer 102 mixes the received interference wave signal (1464 MHz) and the local signal LO1 (1952 MHz) and outputs the intermediate frequency signal (1952−1464=488 MHz).

Figure 3D:
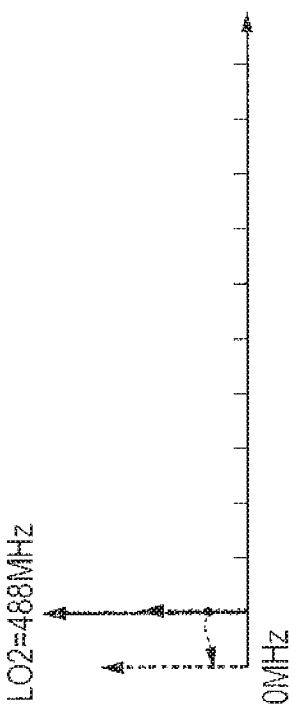

Accordingly, as illustrated in FIG. 3D, the mixer 104 converts the signal into a baseband signal (0 MHz) according to the intermediate frequency signal (488 MHz) and the local signal LO2 (488 MHz). Therefore, the desired frequency signal and the interference wave signal are both superimposed on the baseband signal.

In the embodiment, when receiving the interference wave signal (1464 MHz), it may be superimposed on the desired frequency signal as a noise; therefore, the interference wave signal is eliminated by a filter circuit.

The filter circuit according to the embodiment will be described.

The filter circuit is formed by the mixer 122.

Figure 4:
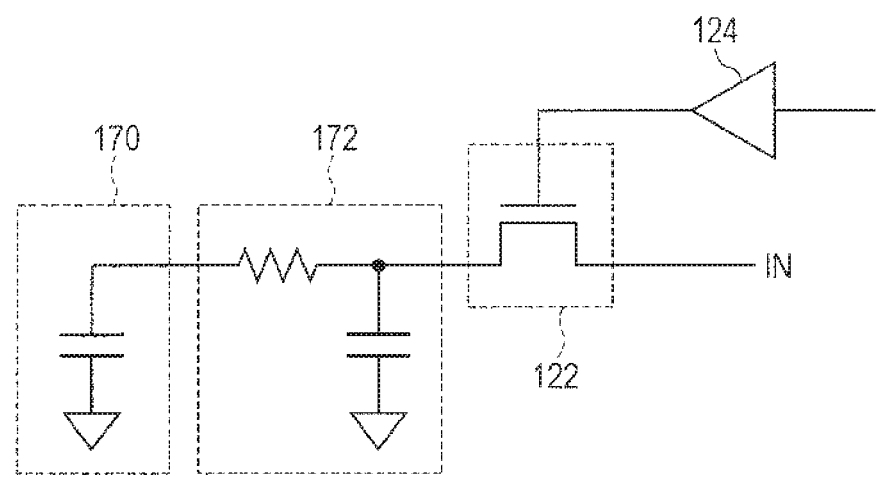
FIG. 4 is a view for use in describing the structure of a mixer 122 and its peripheral circuit according to the embodiment.

FIG. 4 is a view for use in describing the structure of the mixer 122 and its peripheral circuit according to the embodiment.

As illustrated in FIG. 4, the mixer 122 is formed by a switching mixer. Specifically, the switching mixer is formed by a transistor. The source side of the transistor is coupled to the switch SW1 and the gate receives the output of the amplifier 124.

According to the above structure, the component of the frequency signal input to the gate from the received reception signal passes through the transistor and impedance-converted.

In the example, the amplifier 124 receives the signal having the same frequency as that of the interference wave signal (1464 MHz) through the mixer 128. The mixer 128 mixes the signal (976 MHz) obtained by dividing the local signal LO1 (1952 MHz) into two and the signal (488 MHz) obtained by dividing the local signal LO1 (1952 MHz) into four, to generate a signal having the same frequency as that of the interference wave signal (1464 MHz).

Then, the impedance-converted signal is filtered by the LPF 172. Only a high frequency component is cut in the LPF 172 because the signal is impedance-converted into Direct Current (DC) component in the mixer 122.

The LPF 172 includes a resistor and a capacitor.

The detecting unit 170 includes a capacitor, and a voltage of DC component is applied there through the LPF 172, to recover (charge) the capacitor. Because of the DC component, there is no need to provide a rectification circuit. By detecting a voltage by this capacitor, it is possible to eliminate the frequency component of the interference wave included in the reception signal and simultaneously detect the reception of the interference wave.

When the capacitor is not charged, the interference wave can be determined not to be received. When the interference wave is determined not to be received, generation of a signal input to the mixer 122 may be stopped.

Specifically, when the detecting unit 170 does not detect the reception of the interference wave, it may be instructed not to perform the operation of the amplifiers 130 and 132 and the mixing processing of the mixer 128. Here, the existence of the reception of the interference wave may be detected constantly or at predetermined intervals.

Figure 5:
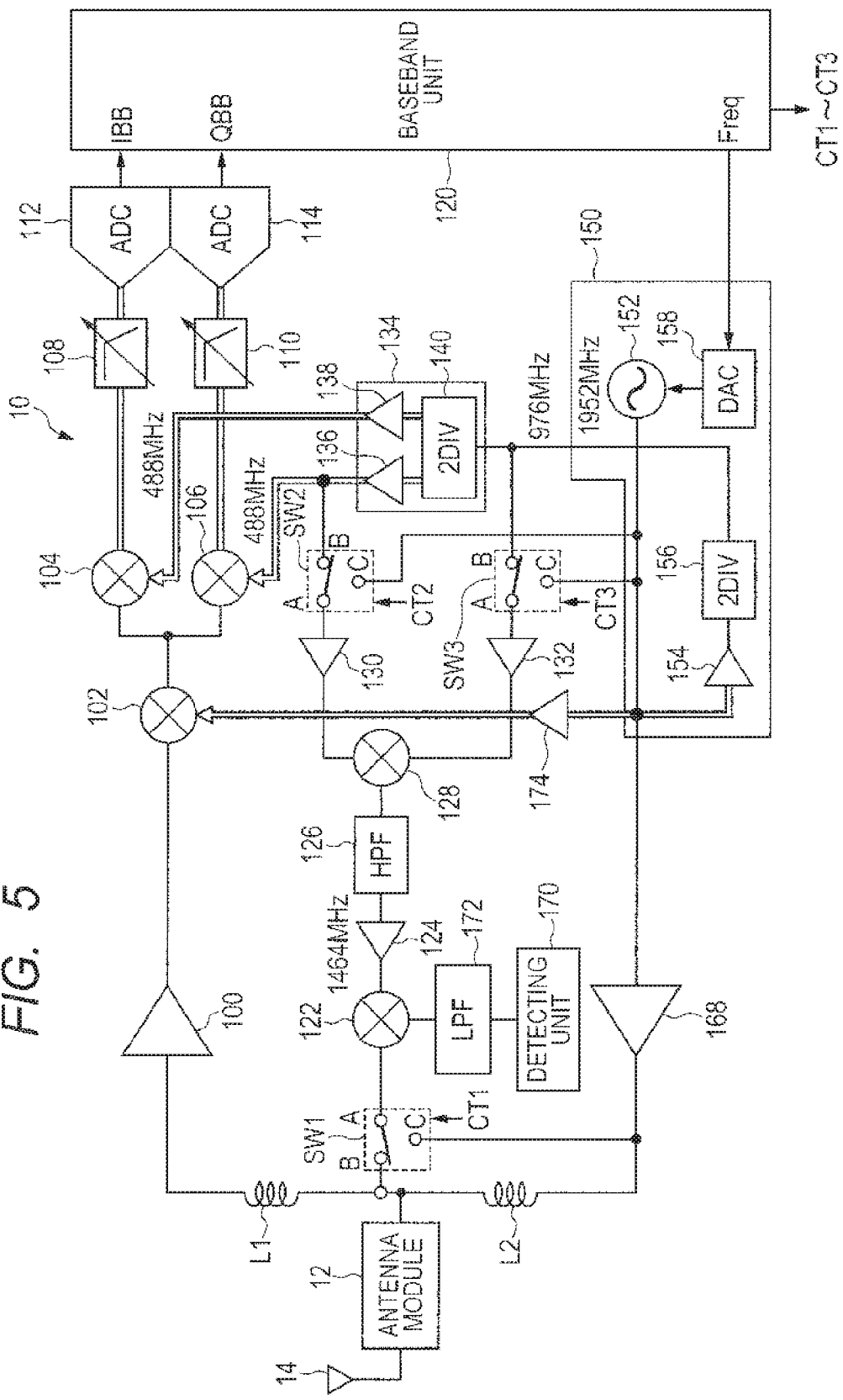
FIG. 5 is a view for use in describing the frequency of an oscillator 152 at a receiving time of the communication device according to the embodiment.

FIG. 5 is a view for use in describing the frequency of the oscillator 152 at the receiving time of the communication device according to the embodiment.

As illustrated in FIG. 5, when the oscillator 152 receives a desired frequency signal (2440 MHz), it oscillates ⅘ frequency of the desired frequency signal (2440 MHz). In the example, the case of oscillating the local signal LO1 of 1952 MHz is illustrated.

The mixer 102 mixes the desired frequency signal (2440 MHz) and the local signal LO1 (1952 MHz) and outputs the intermediate frequency signal (488 MHz).

The mixers 104 and 106 mix the intermediate frequency signal (488 MHz) and the local signal LO2 (488 MHz) and output the baseband signals Ich and Qch.

On the other hand, in the embodiment, the filter circuit eliminates the signal having the same frequency as that of the interference wave signal (1464 MHz).

At this point, the mixer 128 mixes the signal of 976 MHz obtained by dividing the local signal of 1952 MHz into two and the signal of 488 MHz obtained by further dividing the above into two and outputs the frequency signal of 1464 MHz.

Upon receipt of the signal having the same frequency component as that of the interference wave signal (1464 MHz), the mixer 122 passes only the above signal component from the reception signal. According to this, it is possible to eliminate only the frequency component of the interference wave from the reception signal and demodulate only the desired frequency signal.

In the structure according to the embodiment, there is no need to provide a special circuit for eliminating the interference wave but the mixer 128 is provided, hence to be able to generate a signal having the same frequency component as that of the interference wave signal (1464 MHz). As the result, there is no need to provide an oscillator for eliminating the interference wave signal.

Further, by generating and outputting the signal having the same frequency as that of the interference wave signal in the mixer 128, only the signal component of the interference wave signal can be eliminated from the reception signal, in a simple structure.

Figure 6:
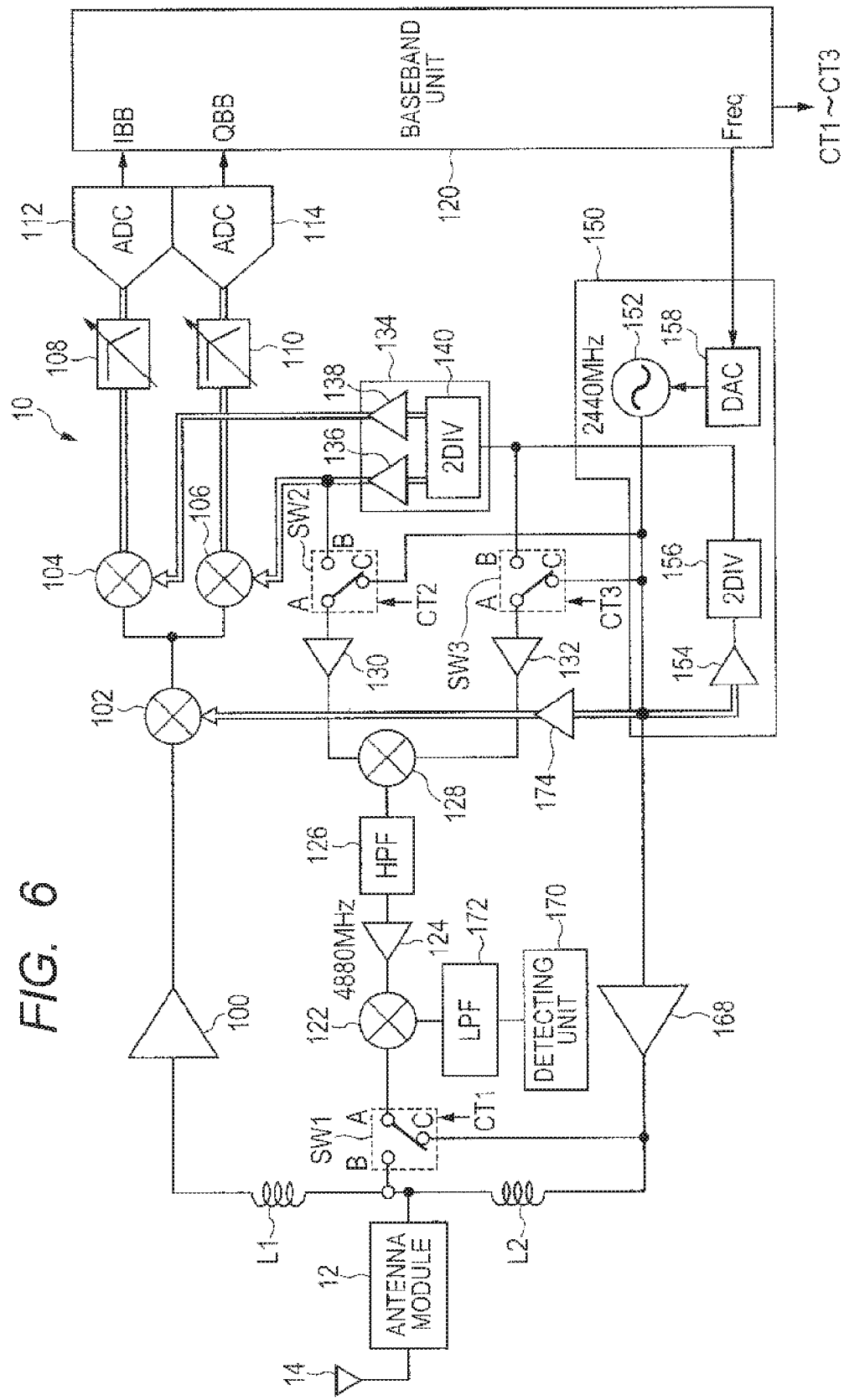
FIG. 6 is a view for use in describing the frequency of the oscillator 152 at a transmitting time of the communication device according to the embodiment.

FIG. 6 is a view for use in describing the frequency of the oscillator 152 at the transmitting time of the communication device according to the embodiment.

As illustrated in FIG. 6, when the desired frequency signal (2440 MHz) is a transmission frequency, the oscillator 152 oscillates at the same frequency as the transmission frequency. In the example, the case of oscillating the local signal LO1 of 2440 MHz is illustrated.

The switches SW1 to SW3 are switched at the transmitting time to couple the contact A and the contact C.

According to this, upon receipt of the two local signals LO1, the mixer 128 mixes the above two and outputs the double frequency signal (4880 MHz).

The switch SW1 couples the contact A and the contact C at the transmitting time. The mixer 122 is coupled to the output node of the amplifier 168.

Upon receipt of the frequency signal (4880 MHz) output from the mixer 128, the mixer 122 extracts the double frequency signal (4880 MHz) of the transmission frequency from the transmission signal.

Figure 7:
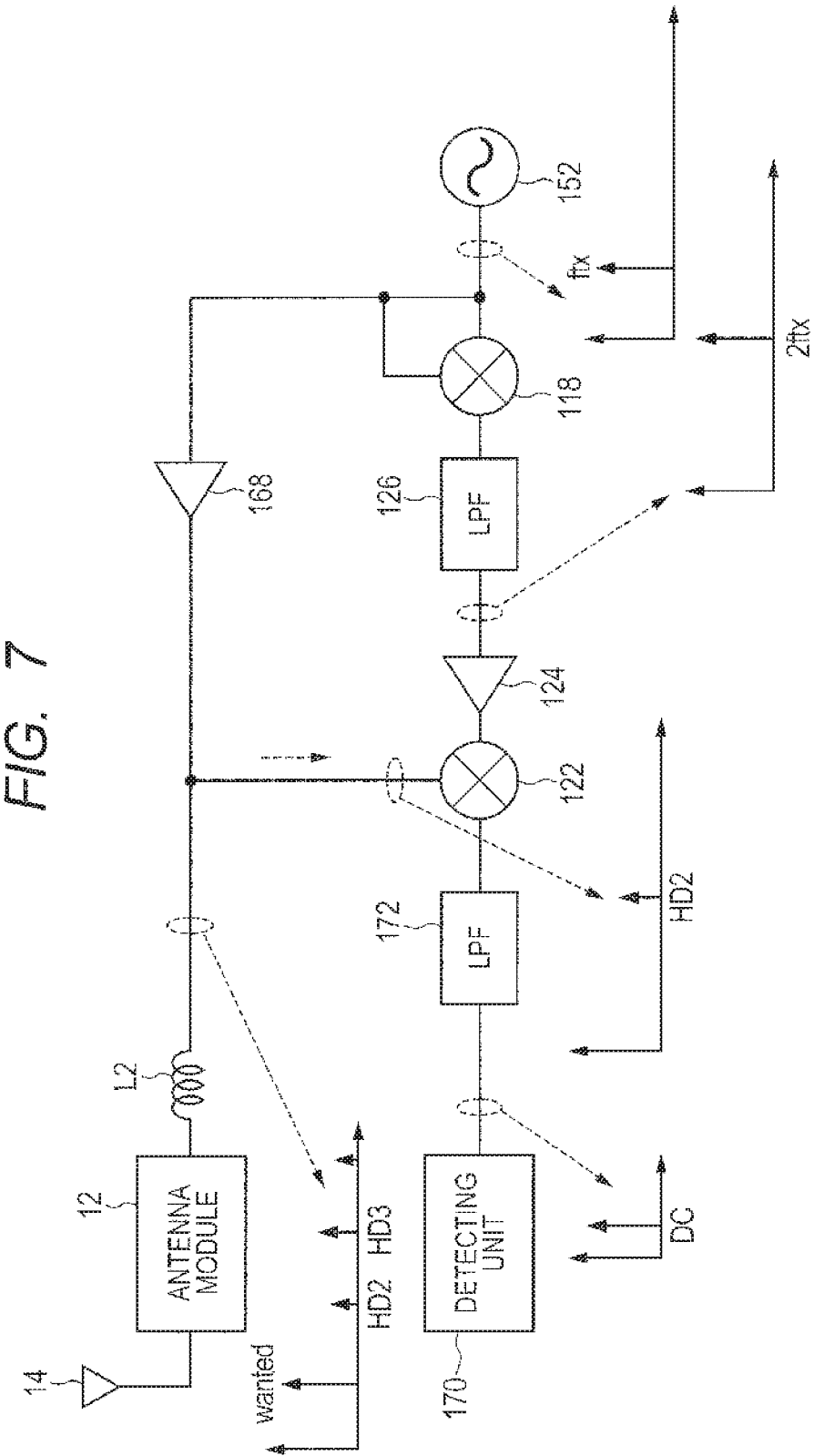
FIG. 7 is a view for use in describing the elimination of higher harmonic wave at a transmitting time of the communication device according to the embodiment.

FIG. 7 is a view for use in describing the elimination of high harmonic wave at the transmitting time of the communication device according to the embodiment.

As illustrated in FIG. 7, the signal of the desired transmission frequency output from the oscillator 152 generates a high harmonic wave when being amplified by the amplifier 168. In the example, the desired transmission frequency signal is defined as ftx. Further, the high harmonic waves are indicated as HD1, HD2, and HD3.

Since the high harmonic wave becomes a noise, the noise has to be eliminated.

The mixer 118 mixes the signals of the transmission frequency from the oscillator 152 and outputs the double frequency signal 2ftx of the transmission frequency to the mixer 122.

The mixer 122 mixes the signal output from the amplifier 168 and the double frequency signal output from the mixer 118. Through the mixing processing, only the component of the double frequency signal output from the mixer 118 is output to the LPF 172. In other words, only the high harmonic wave HD2 is output to the LPF 172.

According to this, the signal input to the transmitting coil L2 has the component with the double high harmonic wave (HD2) suppressed and the signal of the desired transmission frequency with the high harmonic (HD2) suppressed is transmitted from the antenna 14.

The LPF 172 passes only a signal having a lower frequency component of the signals output from the mixer 122. The double high harmonic wave (HD2) is impedance-converted and input to the detecting unit 170 as the DC component. The DC component detected by the detecting unit 170 is to be charged through a connection to the battery 20.

The communication device according to the embodiment can not only eliminate the noise that is the high harmonic wave output from the amplifier 168 but also can recover the high harmonic wave output from the amplifier 168 as the noise, in the battery 20, thereby reducing the power consumption.

Accordingly, the mixer 122 can eliminate the interference wave signal both at the receiving time and at the transmitting time.

In the example, a description has been made about the method of eliminating the high harmonic waver of the double frequency signal of the desired transmission frequency to recover the signal; however, it is not restricted to this but as far as it is a high harmonic wave of n times (2 or more) frequency signal, the above method is similarly applicable.

Even when the transmission frequency from the oscillator 152 is changed according to the frequency hopping system, the mixer 118 can cope with the same system easily because the double frequency signal of the transmission frequency is output to the mixer 122.

MODIFIED EXAMPLE

Figure 8:
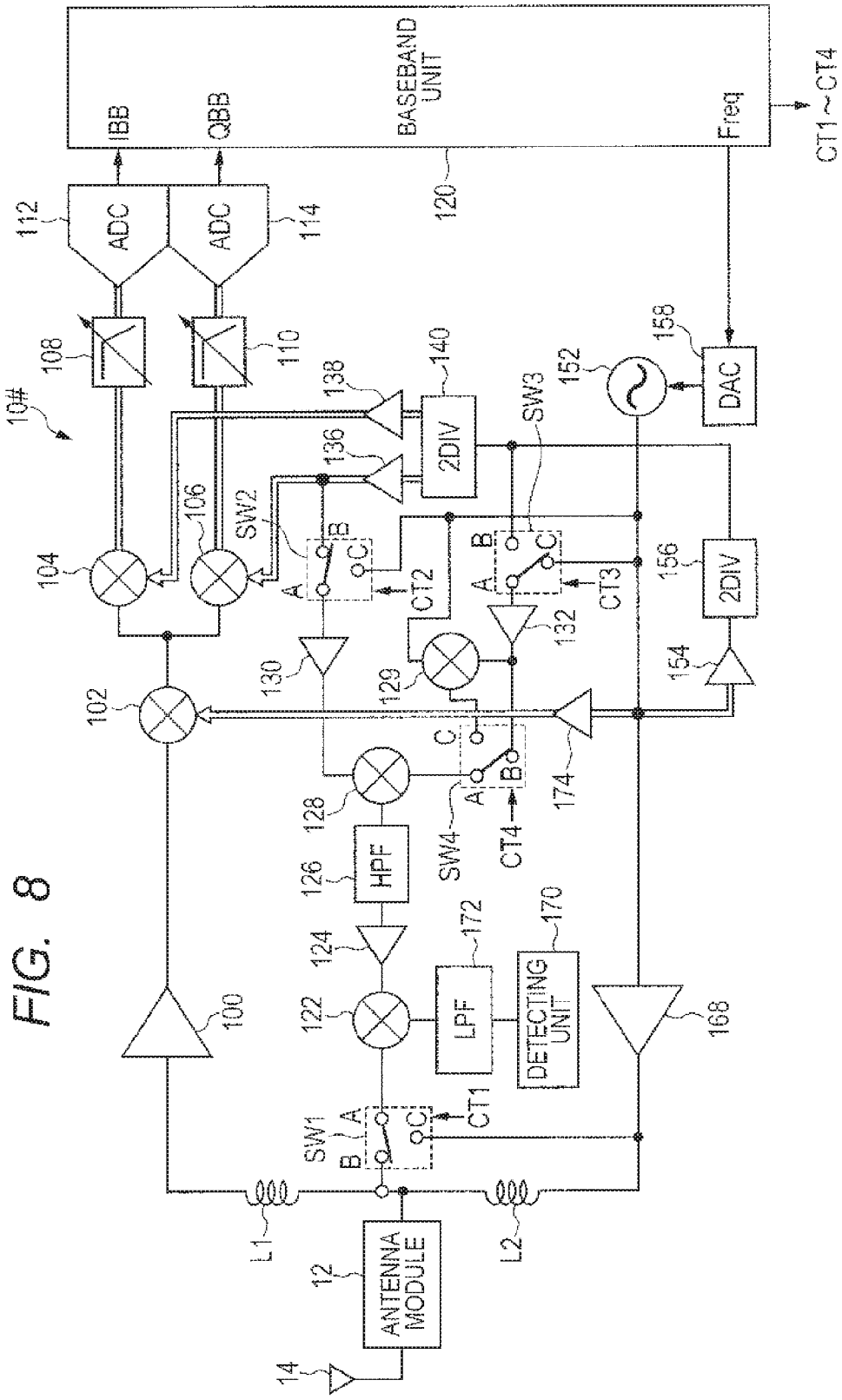
FIG. 8 is a view for use in describing the structure of a communication module 10# of a communication device according to a modified example of the embodiment.

FIG. 8 is a view for use in describing the structure of a communication module 10# of the communication device according to a modified example of the embodiment.

The communication module 10# as illustrated in FIG. 8 is different from the communication module 10 having been described in FIG. 2 in that a mixer 129 and a switch SW4 are additionally provided. The baseband unit 120 outputs a control signal CT4 for controlling the switch SW4, differently from the communication module 10. The other components are the same as those having been described in FIG. 2 and therefore, the detailed description thereof is not repeated here.

The switch SW4 is provided between the amplifier 132 and the mixer 128.

Upon receipt of the output from the amplifier 132 and the output from the oscillator 152, the mixer 129 mixes the above and outputs it to the switch SW4.

The contact A of the switch SW4 is coupled to the mixer 128. The contact B is coupled to the output of the amplifier 132. The contact C is coupled to the output of the mixer 129.

The switch SW4 switches the connection relation according to the control signal CT4.

In the modified example, a structure capable of eliminating two kinds of interference wave signals as the interference wave signal at the receiving time will be described.

Specifically, an interference wave signal (1464 MHz) and an interference wave signal (3416 MHz) are to be eliminated.

In the case of eliminating the interference wave signal (1464 MHz), each of the switches SW1 to SW4 couples the contact A and the contact B, according to the control signals CT1 to CT4. According to this, the same method having been described in FIG. 5 can be used to detect and eliminate the interference wave signal (1464 MHz).

Here, the interference wave signal (3416 MHz) will be described.

Figure 9A:
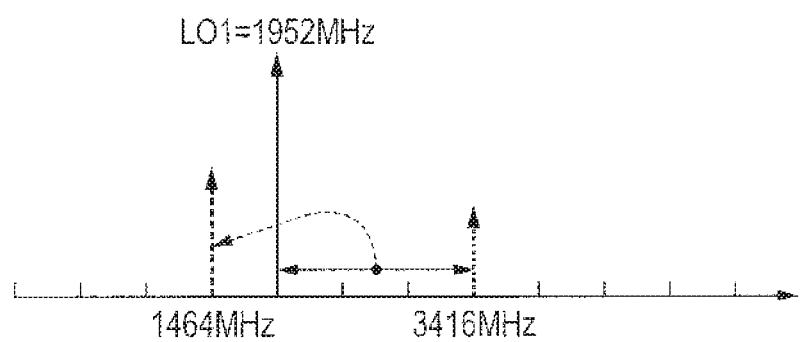
FIGS. 9A and 9B are views for use in describing the frequency conversion of the communication device according to the modified example of the embodiment.
Figure 9B:
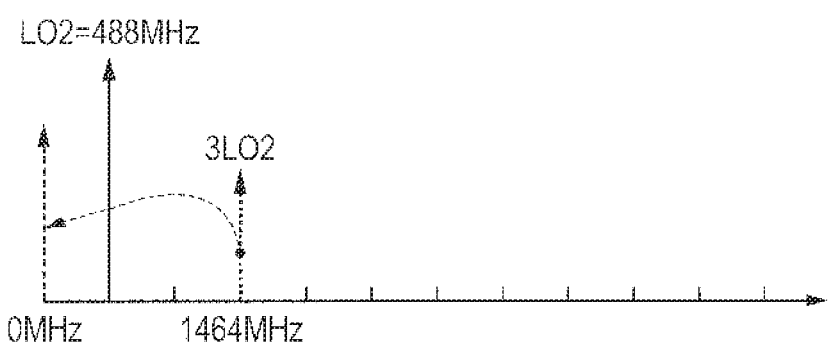

FIGS. 9A and 9B are views for use in describing the frequency conversion in the communication device according to the modified example of the embodiment.

FIG. 9A describes the case of receiving the interference wave signal (3416 MHz).

In the case of receiving the interference wave signal (3416 MHz), the mixer 102 mixes the received interference wave signal (3416 MHz) and the local signal LO1 (1952 MHz) and outputs the intermediate frequency signal (3416−1952=1464 MHz).

FIG. 9B illustrates the three times high harmonic wave (1952 MHz) of the local signal LO2 (488 MHz) output when the amplifiers 136 and 138 amplify the local signal LO2.

Accordingly, the mixers 104 and 106 convert the signal into a baseband signal (0 MHz) according to the intermediate frequency signal (1464 MHz) and the three times high harmonic wave (1464 MHz) of the local signal LO2. As the result, the desired frequency signal and the interference wave signal are both superimposed on the baseband signal.

In the embodiment, when receiving the interference wave signal (3416 MHz), there is a possibility that it may be superimposed on the desired frequency signal as a noise; therefore, the above interference wave signal is eliminated by a filter circuit.

Figure 10:
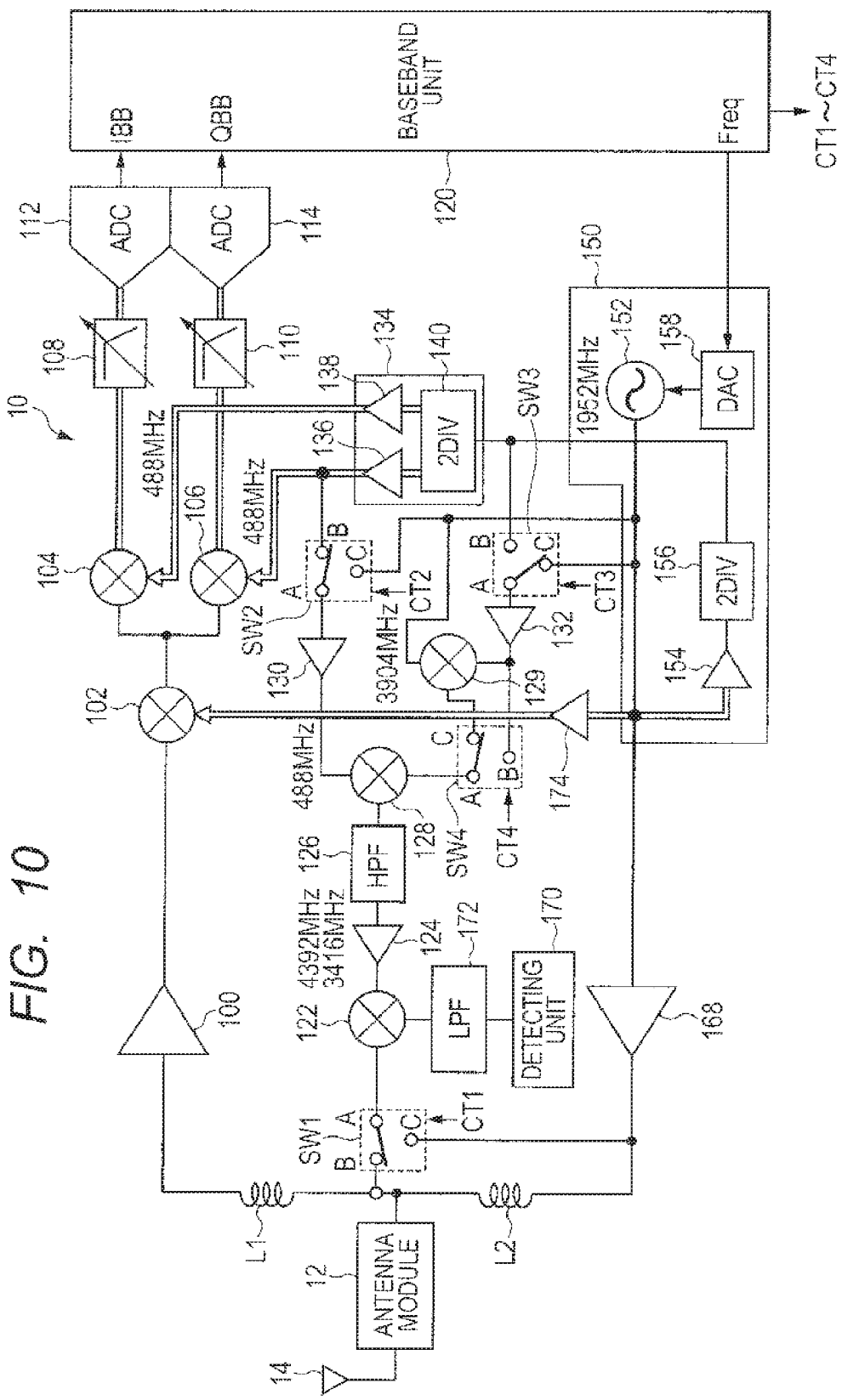
FIG. 10 is a view for use in describing the frequency of the oscillator 152 at a receiving time of the communication device according to the modified example of the embodiment.

FIG. 10 is a view for use in describing the frequency of the oscillator 152 at the receiving time of the communication device according to the modified example of the embodiment.

As illustrated in FIG. 10, when receiving a desired frequency signal (2440 MHz), the oscillator 152 oscillates ⅘ frequency of the desired frequency signal (2440 MHz). In this example, the case of oscillating the local signal LO1 of 1952 MHz is illustrated.

The mixer 102 mixes the desired frequency signal (2440 MHz) and the local signal LO1 (1952 MHz) and outputs the intermediate frequency signal (488 MHz).

The mixers 104 and 106 mixes the intermediate frequency signal (488 MHz) and the local signal LO2 (488 MHz) and outputs the baseband signals Ich and Qch.

On the other hand, in the example, the signal having the same frequency as that of the interference wave signal (3416 MHz) is eliminated through the filter circuit.

When eliminating the interference wave signal (3416 MHz), the switch SW3 couples the contact A and the contact C, according to the control signal CT3. The switch SW4 couples the contact A and the contact C, according to the control signal CT4. Thus, the local signals LO1 (1952 MHz) of the oscillator 152 are input in the mixer 129 to be mixed and a signal of 3904 MHz is output to the switch SW4.

The mixer 128 mixes the signal of 3904 MHz input through the switch SW4 and the signal of 488 MHz input through the switch SW2. According to this, the mixer 128 generates and outputs the frequency signal of 3416 MHz and the frequency signal of 4392 MHz. The signal output from the mixer 128 is input to the mixer 122 through the HPF 126.

Upon receipt of the signal having the same frequency component as that of the interference wave signal (3416 MHz), the mixer 122 passes only the signal component from the reception signal. According to this, it is possible to eliminate only the frequency component of the interference wave from the reception signal and demodulate only the desired frequency signal.

The interference wave signal (3416 MHz) and the frequency signal of 4392 MHz are mixed by the mixer 122, frequency-converted into the signal of 976 MHz, and filtered by the LPF 172. When there is a reception of the interference wave signal (3416 MHz) in the detecting unit 170, a voltage is detected.

In the structure according to the embodiment, there is no need to provide a special circuit for eliminating the interference wave but by providing the mixer 128, the signal having the same frequency component as that of the interference wave signal (1464 MHz and 3416 MHz) can be generated. Therefore, there is no need to provide an oscillator for eliminating the interference wave signal.

By generating and outputting the signal having the same frequency as that of the interference wave signal by the mixer 128, it is possible to eliminate only the signal component of the interference wave signal from the received reception signal and eliminate the interference wave signal in a simple structure.

In the structure according to the modified example of the embodiment, since the two interference wave signals cannot be detected at once, the switches are switched at predetermined intervals so that the detecting unit 170 can detect whether the interference wave signal is received or not, to eliminate the interference wave signal according to the detected interference wave signal.

As mentioned above, the disclosure has been specifically described; however, the disclosure is not restricted to the embodiment but needless to say, various modifications and changes are possible in the range without departing from its spirit.

What is claimed is:

1. A communication device including a communication circuit capable of switching reception or transmission of a desired frequency signal through an antenna,
wherein the communication circuit comprises:
an oscillator that oscillates a first frequency signal according to the desired frequency signal at a receiving time;
a first divider that outputs a second frequency signal obtained by dividing the first frequency signal into two;
a second divider that outputs a third frequency signal obtained by dividing the second frequency signal into two;
a first mixer that mixes a reception signal received through the antenna and the first frequency signal and outputs an intermediate frequency signal;
a second mixer that mixes the intermediate frequency signal and the third frequency signal and outputs a baseband signal;
a third mixer capable of mixing the output from the first divider and the output from the second divider; and
a filter circuit that eliminates a signal component of frequency of an output signal from the third mixer from the reception signal at the receiving time.

2. The device according to claim 1,
wherein the filter circuit includes a fourth mixer that mixes the reception signal and the output signal from the third mixer.

3. The device according to claim 2,
wherein the fourth mixer includes a transistor whose source is coupled to a node for transmitting the reception signal and whose gate receives the output signal from the third mixer.

4. The device according to claim 2,
wherein the filter circuit further includes
a low pass filter that filters a signal output from the fourth mixer, and
a detecting unit that detects a voltage signal of DC component having passed through the low pass filter.

5. The device according to claim 4,
wherein the low pass filter includes a resistor and a capacitor.

6. The device according to claim 1,
wherein the oscillator oscillates the first frequency signal of $4/5$ frequency of the desired frequency signal.

7. The device according to claim 1, further comprising:
a low pass filter that filters the baseband signal output from the second mixer; and
a conversion circuit that converts a signal having passed through the low pass filter into a digital signal.

8. The device according to claim 1,
wherein the communication circuit further includes a control circuit that stops the third mixer based on the output result of the filter circuit.

9. The device according to claim 1, further comprising
a fourth mixer that outputs a fourth frequency signal that is double the first frequency signal, and
a switch that switches the second frequency signal of the first divider and the fourth frequency signal of the output from the fourth mixer and outputs the above to the third mixer.

10. The device according to claim 1,
wherein the oscillator oscillates the desired frequency signal at a transmitting time,
wherein the communication circuit comprises:
a first switch that switches a signal path from the first divider to the third mixer to a signal path from the oscillator to the third mixer at the transmitting time;
a second switch that switches a signal path from the second divider to the third mixer to a signal path from the oscillator to the third mixer at the transmitting time; and
a third switch that switches the reception signal input to a transmission signal input at the transmitting time, and wherein the filter circuit eliminates a signal component of the frequency of the output signal from the third mixer, from the transmission signal to be transmitted at the transmitting time.

11. A method of controlling a communication device including a communication circuit capable of switching reception or transmission of a desired frequency signal through an antenna, comprising the following steps of:
oscillating a first frequency signal according to the desired frequency signal at a receiving time;
outputting a second frequency signal obtained by dividing the first frequency signal into two;
outputting a third frequency signal obtained by dividing the second frequency signal into two;
mixing a reception signal received through the antenna and the first frequency signal and outputting an intermediate frequency signal;
mixing the intermediate frequency signal and the third frequency signal and outputting a baseband signal;
mixing the second and third frequency signals and outputting a fourth frequency signal; and
eliminating a signal component of a frequency of the fourth frequency signal from the reception signal at the receiving time.

* * * * *